Sept. 10, 1957 A. E. JOEL, JR 2,806,088

COMMUNICATION SYSTEM

Filed Dec. 3, 1953 9 Sheets-Sheet 1

FIG. 1 LINE CONCENTRATOR, FIG. 10

INVENTOR
A. E. JOEL, JR.
BY C. Mattie
ATTORNEY

Sept. 10, 1957 A. E. JOEL, JR 2,806,088

COMMUNICATION SYSTEM

Filed Dec. 3, 1953 9 Sheets-Sheet 2

INVENTOR
A. E. JOEL, JR.
BY C. Mattice
ATTORNEY

Sept. 10, 1957 A. E. JOEL, JR 2,806,088

COMMUNICATION SYSTEM

Filed Dec. 3, 1953 9 Sheets-Sheet 3

INVENTOR
A. E. JOEL, JR.
BY C. Mattice
ATTORNEY

INVENTOR
A. E. JOEL, JR.
BY
ATTORNEY

INVENTOR
BY A. E. JOEL. JR.
C. Mattice
ATTORNEY

INVENTOR
A. E. JOEL, JR.
BY C. Mathie
ATTORNEY

Sept. 10, 1957 A. E. JOEL, JR 2,806,088

COMMUNICATION SYSTEM

Filed Dec. 3, 1953 9 Sheets-Sheet 7

INVENTOR
A. E. JOEL, JR.
BY C. Mathie
ATTORNEY

Sept. 10, 1957 A. E. JOEL, JR 2,806,088

COMMUNICATION SYSTEM

Filed Dec. 3, 1953 9 Sheets-Sheet 8

INVENTOR
A. E. JOEL, JR.
BY C. Mattice
ATTORNEY

COMMUNICATION SYSTEM

Filed Dec. 3, 1953 9 Sheets-Sheet 9

INVENTOR
A. E. JOEL, JR.
BY C. Mattice
ATTORNEY

United States Patent Office 2,806,088

Patented Sept. 10, 1957

2,806,088

COMMUNICATION SYSTEM

Amos E. Joel, Jr., South Orange, N. J., assignor to Bell Telephone Laboratories, Incorporated, New York, N. Y., a corporation of New York Application December 3, 1953, Serial No. 395,942

9 Claims. (Cl. 179—18)

Figure 1:
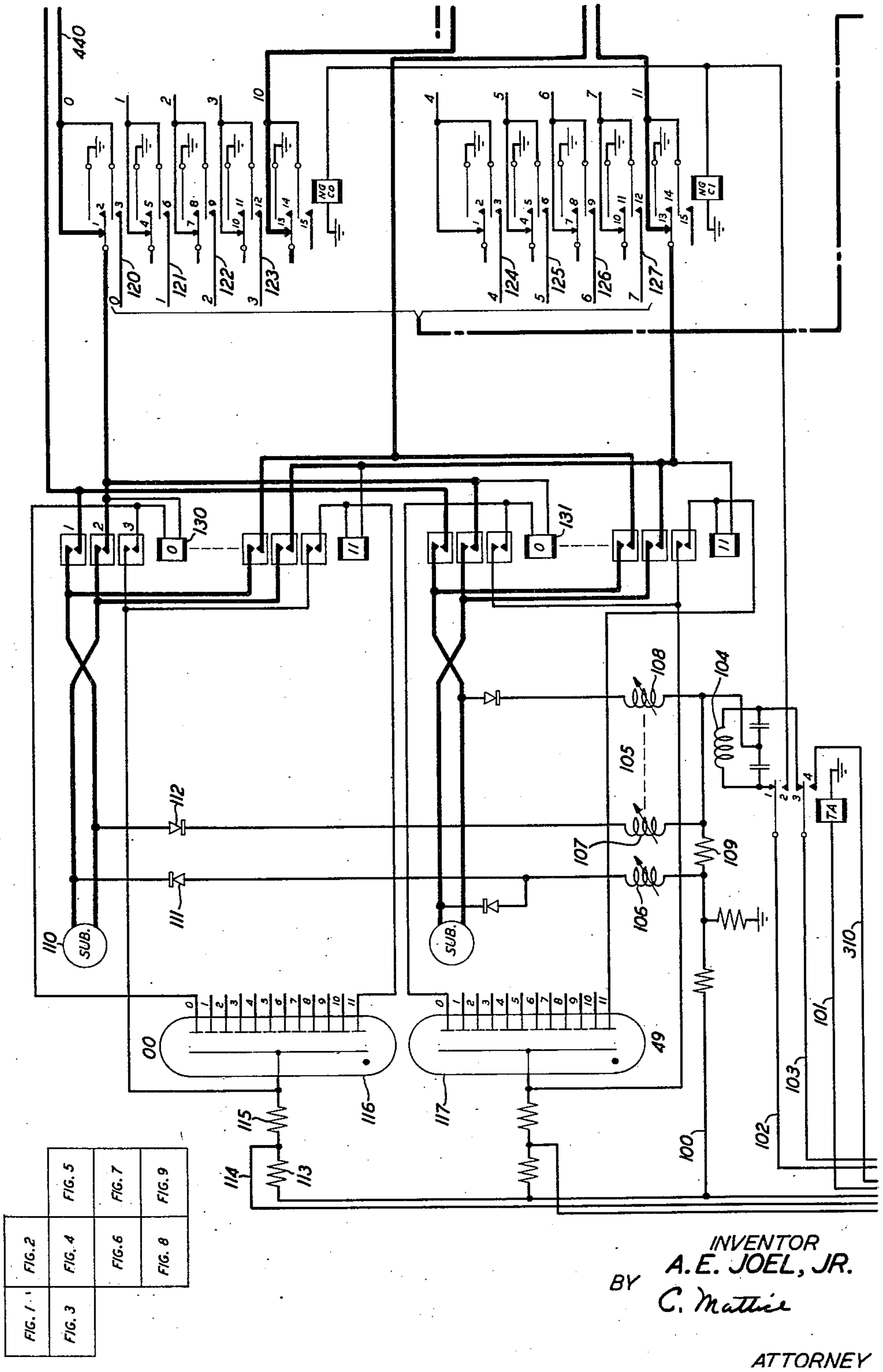

This invention relates to dial telephone systems and has for its object economy in the wiring connecting central offices with subscriber substations.

Normally each substation requires a pair of line wires to connect it with the central office and, where the substation is located at a considerable distance from the central office, the cost of these wires is substantial. The trend toward housing developments on the outskirts of cities multiplies this cost materially.

In accordance with the present invention a group of subscribers, located in proximity with one another and remote from a central office employing crossbar type switches, may be served with greater economy by providing a line concentrator in the subscribers' locality. Such a line concentrator serves in place of the usual primary line switch and the trunks outgoing from the line concentrator appear as line links in the secondary line switches or line junctor switches of a modified line link frame. In addition to the talking trunks a pair of control trunks are provided.

In accordance with one feature of the invention the equipment at the line concentrator includes a number translator. When it is desired to connect with one of the lines, one conductor of each of a plurality of the talking trunks is temporarily connected to the translator which is then set in code in accordance with the identity of the wanted line. When the translator operated, the wanted line is pretested for a busy or idle condition and the condition recorded at the central office before the usual central office busy test is permitted to take place.

Connections are established at the line concentrator by means of reed type relays operated in series with a gas diode. There is a set of relay-diode combinations for each line, each set including one relay-diode combination for each trunk. The relay windings are connected to one conductor of the associated trunk while the diodes are connected in multiple. If it is desired, a multi-anode gas tube may be substituted for the gas diodes, each relay being connected to a separate anode. If the desired line is found to be idle the central office busy test results in the connection of a predetermined potential by way of a control conductor and the translator to the multipled diodes and a second potential to one wire of an idle trunk, resulting in the breakdown of the associated gas diode and the operation of the reed relay to complete the connection of the wanted line over the idle trunk to the central office.

When the reed relay operates it shunts its associated gas diode, marking the line busy. When it is desired to make a no-test connection with a line, a no-test indicating means is operated in the central office. The line is then pretested and if the line is idle the connection is set up in the usual manner. If the line is busy, the busy recording means and the no-test indicating means are jointly effective to apply an increased potential over the control conductor to the multipled diodes which, in combination with the potential applied to an idle trunk, is sufficient to cause a second gas diode to break down and establish a second connection with the line.

Figure 2:
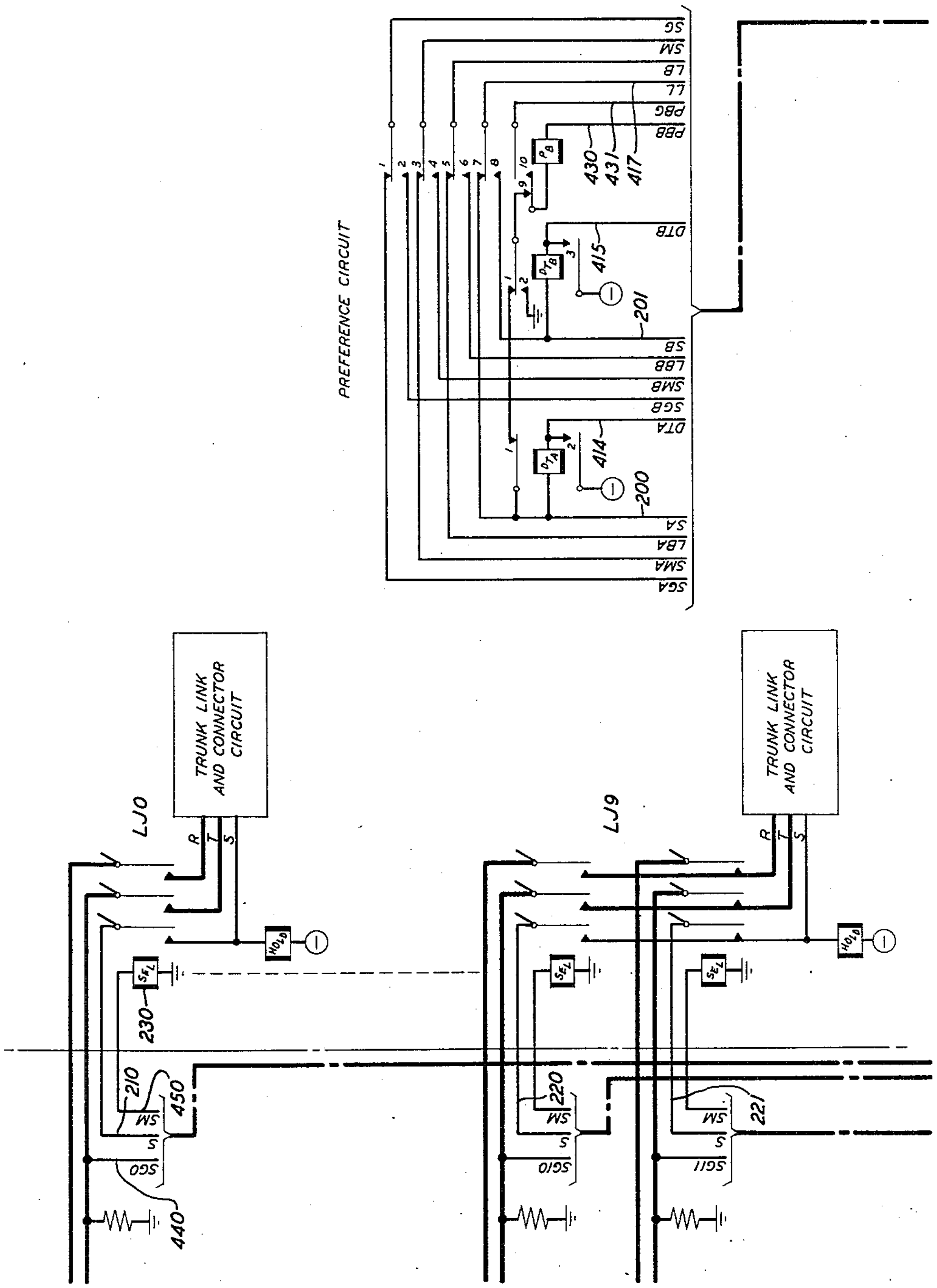
Figure 3:
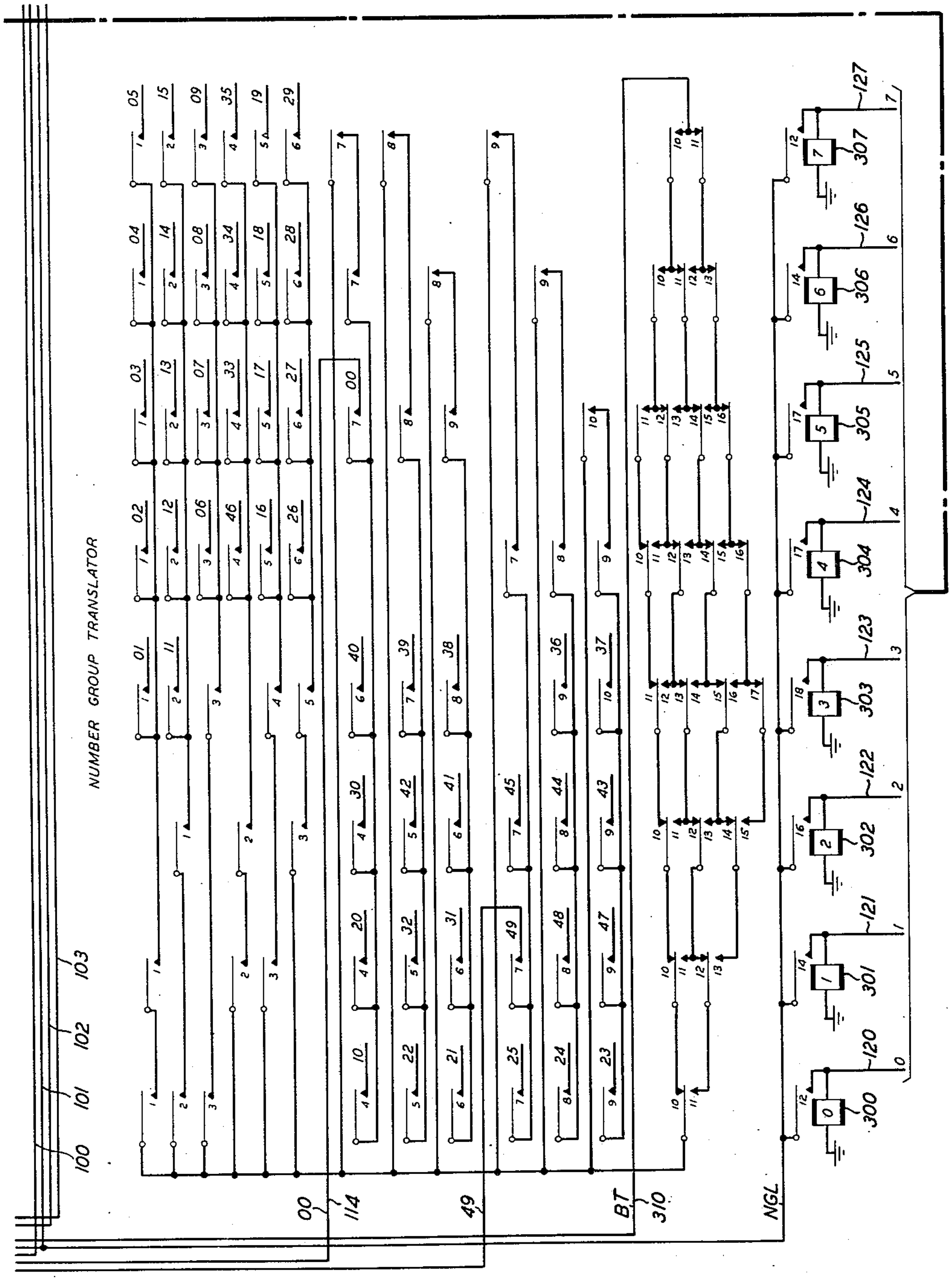
Figure 4:
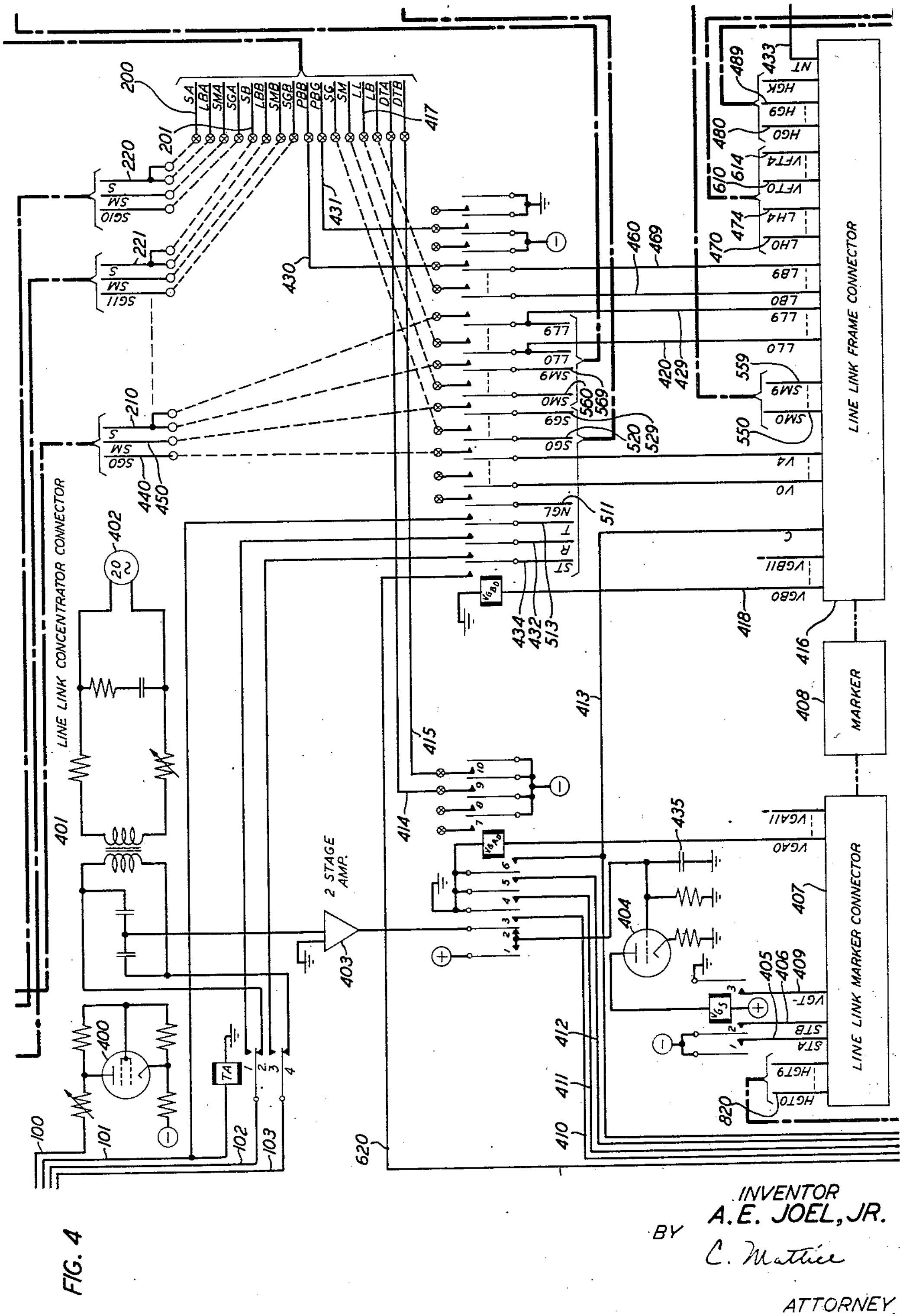
Figure 5:
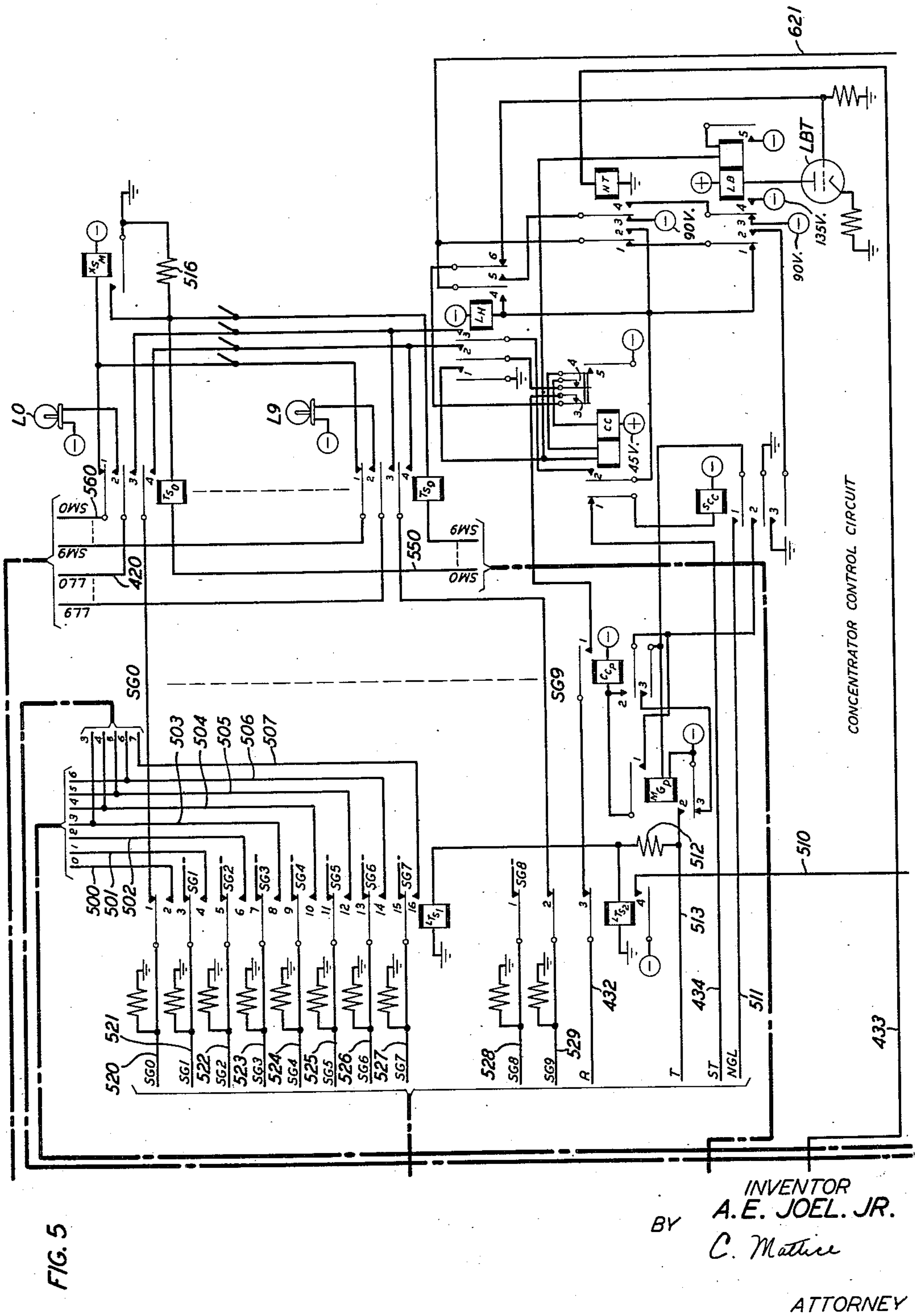
Figure 6:
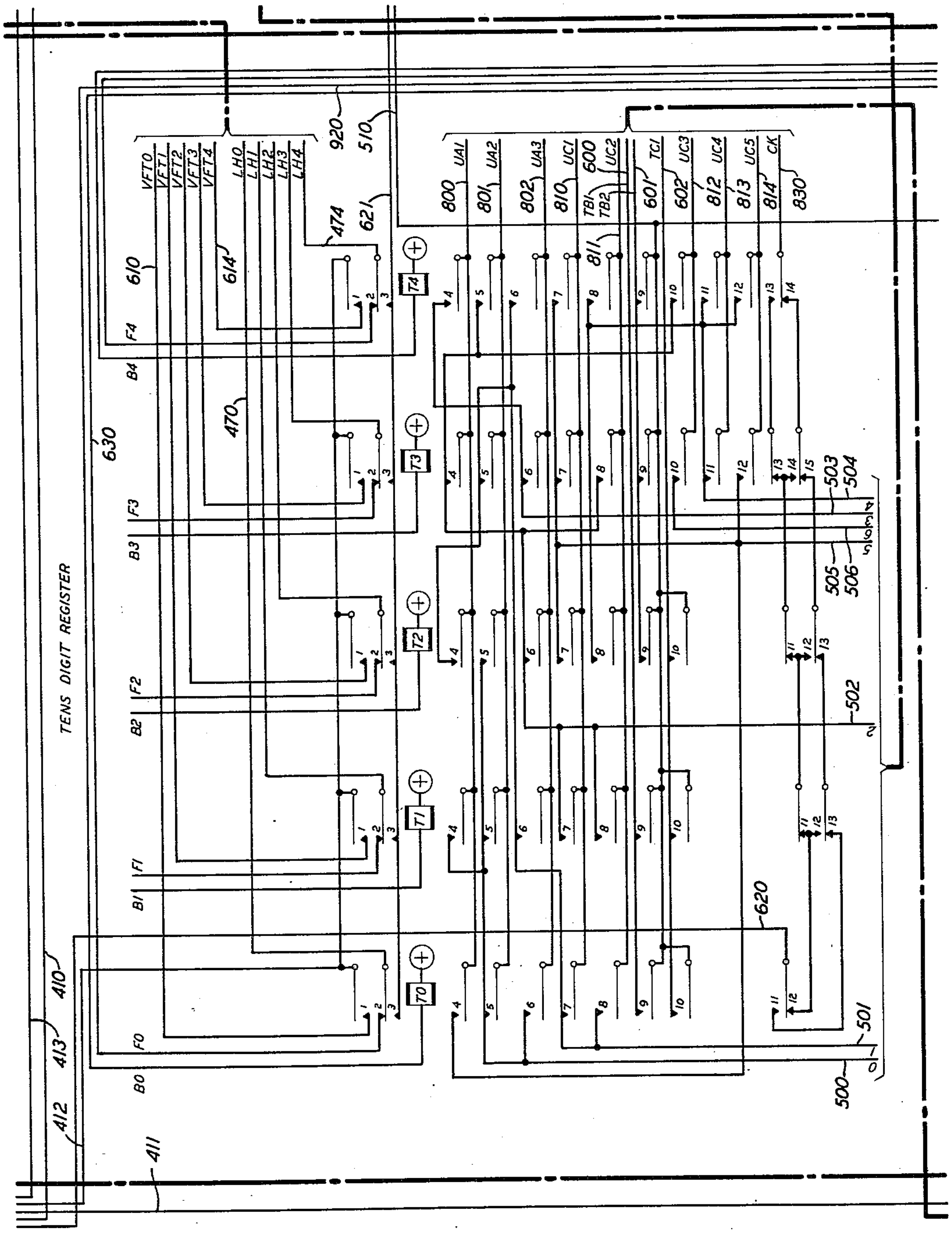
Figure 7:
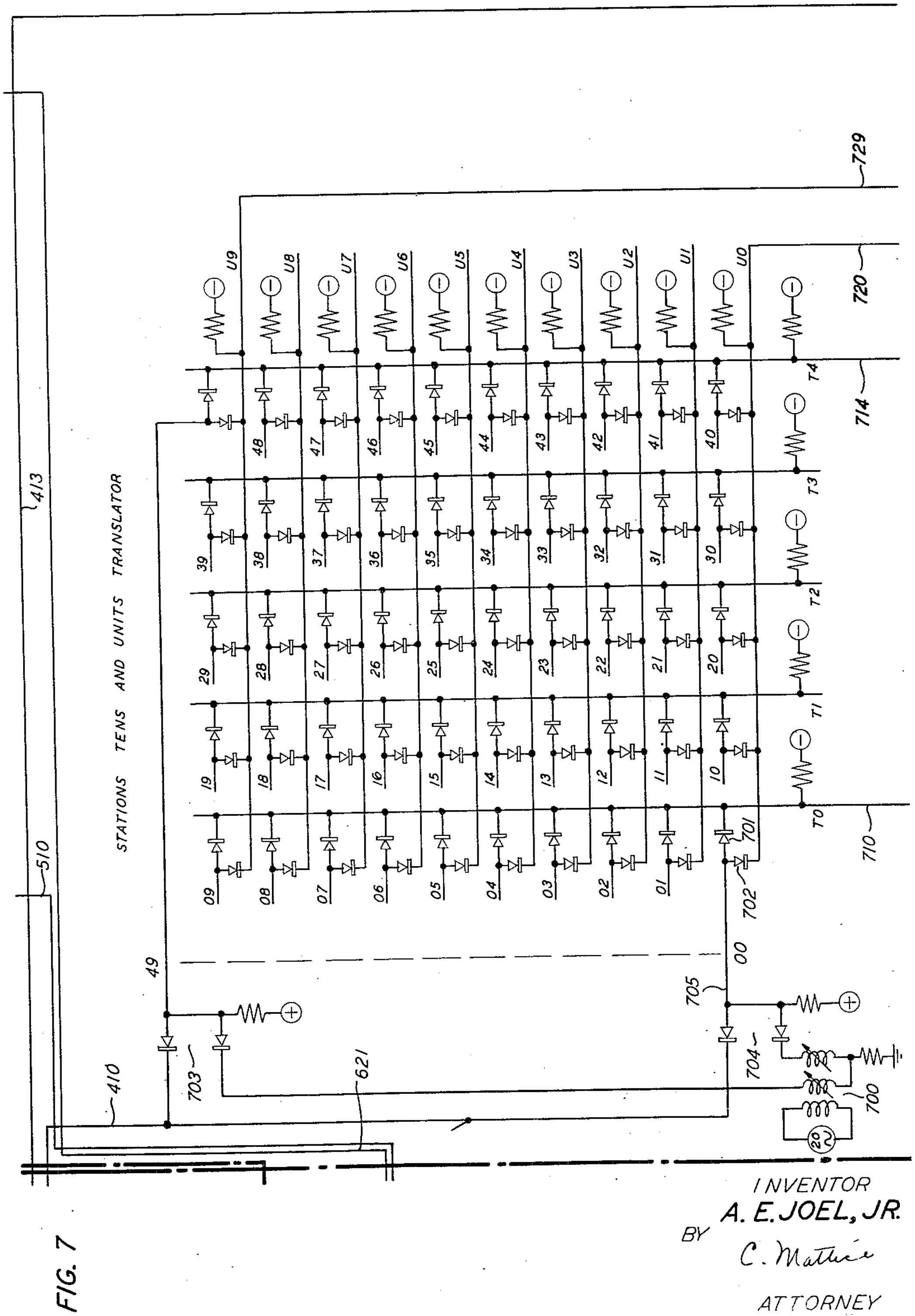
Figure 8:
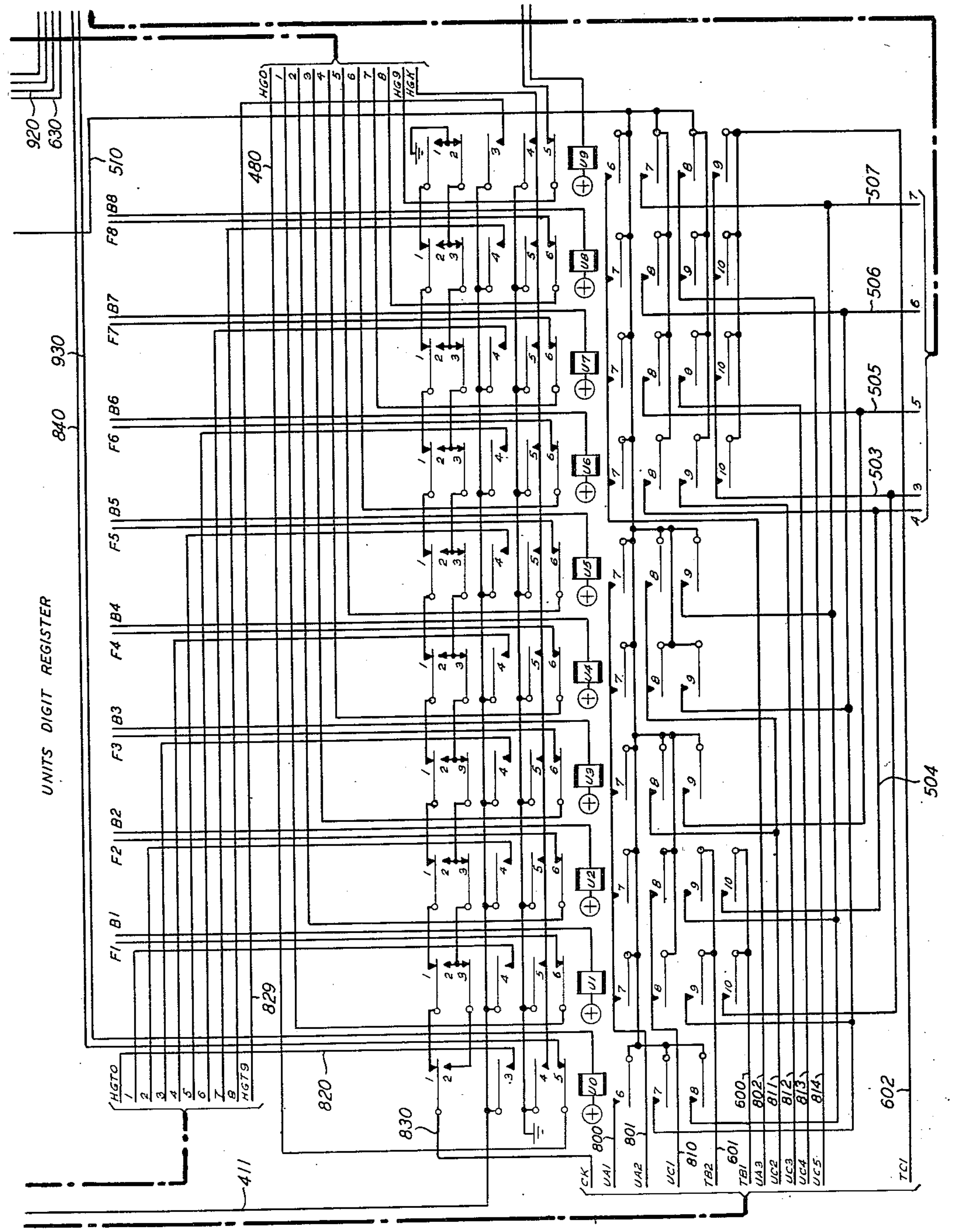
Figure 9:
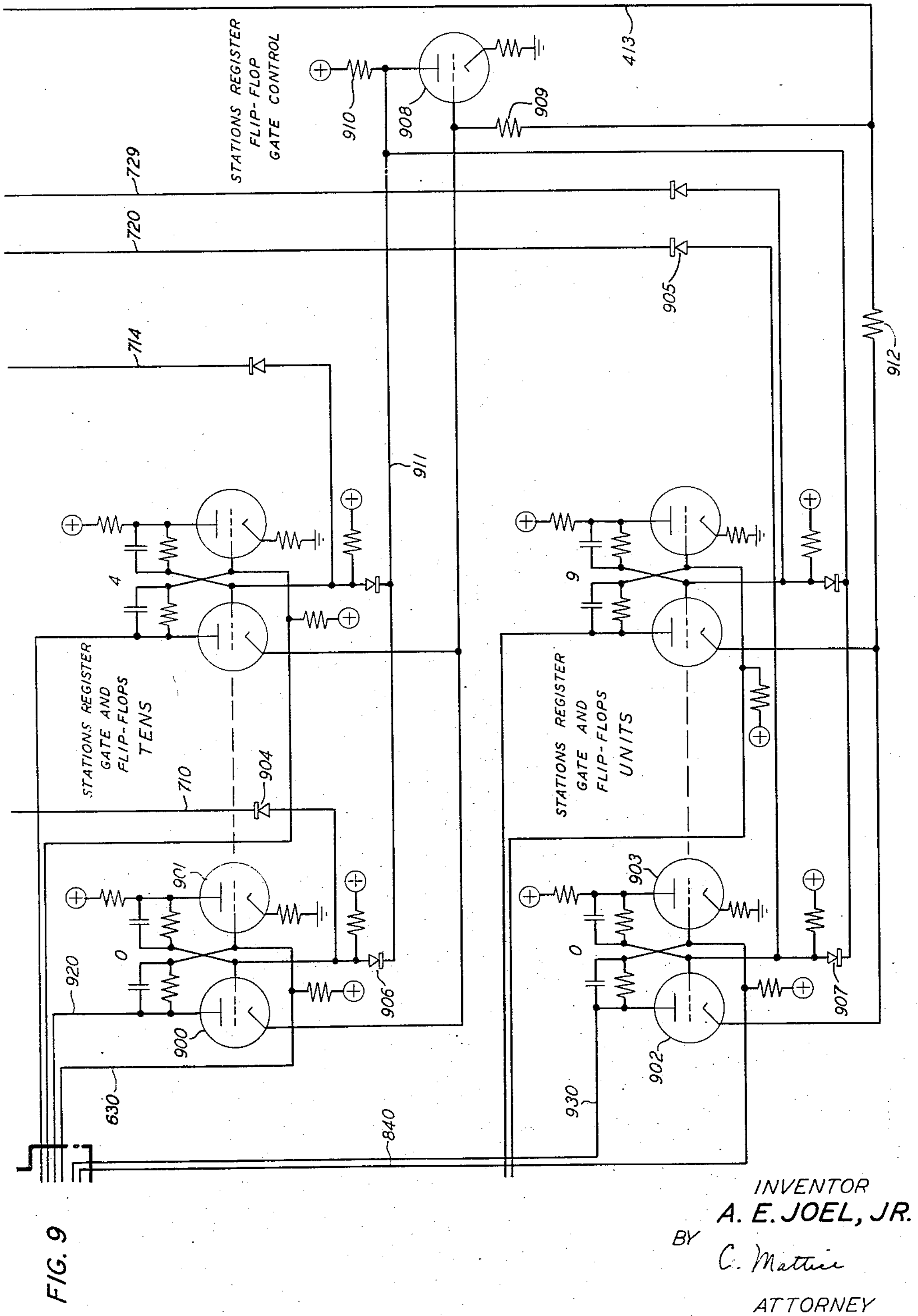

These and other features of the invention will be more clearly understood from a consideration of the following description read in connection with the drawing in which:

Figs. 1 and 3 show the equipment at the line concentrator;

Fig. 1 showing two lines and two trunks with the reed-diode combinations associated therewith;

Fig. 3 showing the line number translator;

Figs. 2 and 4 to 9 show the equipment at the central office;

Fig. 2 showing line junctor switches in which the incoming trunks terminate, together with a preference circuit for use where more than one trunk appears in one line junctor switch;

Fig. 4 showing the line link concentrator connector;

Fig. 5 showing the concentrator control circuit;

Fig. 6 showing the tens digit register;

Fig. 7 showing the scanner and calling line identifier;

Fig. 8 showing the units digit register;

Fig. 9 showing the control circuits for the registers; and

Fig. 10 shows the manner in which Figs. 1 to 9 are to be arranged.

In the drawings functional designations are used for the various pieces of equipment and in the subsequent description, the location of the equipment is indicated by annexing to the functional designation the number of the figure in which the equipment may be found, set off by parentheses.

This line concentrator circuit is especially designed for use with a crossbar central office of the type disclosed in United States Patent 2,585,904 granted to A. J. Busch, February 19, 1952 and reference is made to that patent for a description of the operation of the central office control circuits.

In the crossbar system of the above-identified patent the subscribers' lines are identified according to their location on the line link frame, each frame having a maximum of six hundred lines arranged in ten horizontal groups or levels and a maximum of twelve vertical groups, each vertical group including five vertical files. The lines appearing in each horizontal group are served by ten line links which connect the primary line switches with each of ten secondary or line junctor switches. The wanted line is identified to the marker which controls the operation of the crossbar switches by means of a two-digit frame designation, a vertical group digit, a horizontal group digit and a vertical file digit.

In designing the line concentrator to work with this crossbar system a maximum of twelve concentrators are provided which may be identified by the vertical group digit. Each line concentrator serves a maximum of fifty lines identified by a combination of a horizontal group digit and a vertical file digit. The frame on which the trunks incoming from the concentrator appear is identified by the frame designation in the usual manner.

As previously mentioned, the concentrator is connected with the central office by ten two-wire trunks which appear in the line junctor switches of the line link frame. The lines are connected to the trunks by means of reed type relays, each line having a group of ten such relays, one for each trunk. These relays are controlled either by individual gas diodes or by a multianode gas tube having an anode for each relay. For convenience the multianode gas tubes have been shown.

To select a desired line a line number translator is provided, which is set from registers at the central office. When it is desired to set the line number translator, a pair of transfer relays is operated which disconnect one conductor of each of a plurality of trunks from the reed relays, substituting a local holding circuit for the reed relays in case any of them are operated and for associated relays at the central office, and connect these trunk conductors to the translator to operate the relays of the translator, after which the transfer relays are released.

While there are normally ten line links and therefore ten trunks connecting a line concentrator with a central office, it is possible, if traffic demands, to provide one or two additional trunks, each of which is paired with one of the ten trunks. The paired trunks appear in the same line junctor switch and means is provided at the central office so that the marker can test only one of the pair of trunks at a time. To avoid using paired trunks for transmitting the line designation, only the eight unpaired trunks are used for this purpose and a three-out-of-eight code is used for setting the line number translator.

The fact that a call has been initiated and the identity of the calling line is indicated on a time division basis to the central office by means of a non-mechanical kick coil scanner which may be of the type disclosed in the application of F. T. Andrews, Jr., Serial No. 302,444, filed Aug. 2, 1952, which issued August 16, 1955 as Patent No. 2,715,657.

At the line link frame control circuit of the central office there is an individual connector circuit for each concentrator, together with a frame control circuit including a common scanner, a translator for converting the scanner pulses to a two-digit indication of the identity of a calling line and a pair of electronically controlled registers for registering the identity of either a calling or a called line. The usual type of frame connector and marker connector are provided for connecting the marker with the control circuit of the line link frame on which the concentrators terminate.

The functioning of the line concentrator and the associated central office equipment will be more clearly apparent from the following description of a call originated at the line concentrator and one extended to the line concentrator.

As previously stated, in addition to the outgoing trunks there are two two-wire control trunks connecting the central office with the concentrator namely, a control trunk and a signaling trunk. Over one conductor of the control trunk, conductor 100, −48 volt battery is supplied to the line concentrator. This potential is supplied through a voltage-regulating network including tube 400 and a plurality of resistances to insure that the potential remains constant, independent of the current drain at the concentrator. The second conductor of the control trunk, conductor 101, is connected to the windings of the transfer relays TA(4) and TA(1) and is used for transferring the signal trunk conductors from the call originating equipment to the call completing equipment.

Conductors 102 and 103 constitute the signaling trunk. At the concentrator these conductors are normally connected over contacts 1 and 3 of relay TA(1) to the output winding 104 of the line scanner 105. At the central office these conductors are connected over contacts 2 and 4 of relay TA(4) to the scanning pulse generator 401 and to a pulse detector including amplifier 403 and detector tube 404. As described in detail in the above-identified Andrews patent the scanning pulse generator 401 provides a series of pulses which are directed by the line scanner to each of the lines in time sequence. At the concentrator the line scanner has a plurality of secondary windings including an individual winding for each line which is connected to one side of that line through a unidirectional device and a common winding which is connected to the other side of all lines through individual unidirectional devices. The common winding and the individual windings are connected to opposite ends of the resistance 109 so that the strength of each pulse varies according as the line circuit is open or closed.

Assuming that the subscriber at substation 110 occupying the No. 00 time slot originates a call, the shunt by way of winding 106, unidirectional device 111, substation 110, unidirectional device 112 and winding 107 will be closed around resistance 109, generating a heavy pulse in the time slot No. 00.

At the central office this heavy pulse is amplified by amplifier 403 and detected by tube 404. Condenser 435 lengthens the effect of the pulse sufficiently to cause the operation of relay VGS(4) individual to the concentrator of Figs. 1 and 3, which is connected to the output of detector tube 404. Relay VGS(4) will remain operated under the control of tube 404 and condenser 435 as long as a pulse appears on the grid of tube 404 at least once every twentieth of a second. Relay VGS(4), in operating, connects battery over its contacts 1 and 2 to start conductors 405 and 406, causing the line link marker connector 407 to select an idle marker such as marker 408 and connect the marker with the line link frame on which the concentrator appears. Relay VGS(4) also connects ground to conductor 409 to identify to the marker the vertical group to which the concentrator corresponds. As soon as the marker is connected with the line link frame and receives the vertical group indication it operates vertical group relay VGA0(4).

Relay VGA0(4), in operating, connects plus battery to the grid of tube 404 to hold relay VGS(4) operated. Relay VGA0(4) also connects ground to conductors 411, 412 and 413 for purposes which will appear hereinafter and connects battery to conductors 414 and 415 to operate relay DTA(2) or DTB(2) if the associated incoming trunk is busy. Contacts 7 and 8 of relay VGA0(4) are provided to control a similar preference circuit if required. With relay VGA0(4) operated, amplifier 403 is disconnected from tube 404 and extended over contact 3 of relay VGA0(4) and conductor 410 to the common line link frame scanner 700.

The common signal is in synchronism with the signal at all concentrators since the phase of the twenty cycles sent over the signaling trunk to each concentrator is controlled individually by a potentiometer in the phase-changing RC circuit. The common scanner is similar to the scanner at the concentrator and also includes fifty coils, through which pulses are transmitted to one-half of each of the fifty gate circuits, such as gates 703 and 704, which are associated with each of the fifty time slots, each gate circuit comprising a pair of unidirectional devices. The other half of each gate circuit is connected in multiple to conductor 410 to which the signaling circuit has been extended as previously described. Only when a positive signal appears simultaneously on conductor 410 and the coil associated with the active time slot is a gate enabled and a positive pulse sent to one of the fifty leads extending to the tens and units translator.

Since it was assumed that the calling line occupied time slot No. 00, when scanner 700 feeds a pulse to gate 704, a pulse from tthe line concentrator will appear on conductor 410 and a positive pulse will pass to conductor 705.

Each lead entering the tens and units translator is connected to two unidirectional devices which place the positive pulse signal on one of the tens conductors 710 to 714 and on one of the units conductors 720 to 729. The pulse on conductor 705 passes to tens conductors 710 and units conductors 720. The normally negative bias on these conductors is overridden by the positive pulse from the common scanner gate. This causes a positive voltage to appear on the grid of tube 900 serving as the left half of the No. 0 tens stations register flip-flop and on the grid of tube 902 serving as the left half of the No. 0 units stations register flip-flop as a result of back-biasing the unidirectional devices 904 and 905. The unidirectional devices 906 and 907, which are connected in parallel with devices 904 and 905, respectively, function as a part of gate 704 to prevent the grids of tubes 900 and

902 from becoming positive from a pulse on conductor 710 or 720 after the registration has been made.

The flip-flop gate control tube 908 is normally nonconducting, due to ground connected to the grid of the tube through resistance 909, over conductor 413 and contact 6 of relay VGA0(4). When any one of the tens register tubes, such as tube 900, is conducting, current flow through the common cathode resistance 909 changes the potential on the grid of tube 908 to cause that tube to conduct. Current flow through resistance 910 causes conductor 911 to become negative with respect to the grid bias resistors for the register tubes, such as tubes 900 and 902, to prevent any other register tubes from operating.

The positive potential on the grid of tube 900 causes this tube to conduct, completing a circuit from ground on conductor 413, resistance 909 through tube 900, conductor 920 to positive battery through the winding of relay T0(6), operating relay T0(6). Similarly the positive potential on the grid of tube 902 causes this tube to conduct, completing a circuit from ground on conductor 413, resistance 912 through tube 902, conductor 930 to positive battery through the winding of relay U0(8), operating relay U0(8). The completion of these circuits causes the normally conducting right halves of the flip-flops, namely tubes 901 and 903, to cease conducting.

As previously mentioned, a maximum of eight conductors are available for transmitting the line number to the line concentrator. In order to use these eight conductors for transmitting the designation as a single operation, a three-out-of-eight code has been developed and the tens and units registers are designed to mark three of the conductors 500 to 507 in accordance with the following table, in which only the units digit of the conductor designation is indicated:

| Line Units Digit | Line Tens Digit | | | | |
|---|---|---|---|---|---|
| | 0 | 1 | 2 | 3 | 4 |
| 0 | 567 | 067 | 167 | 267 | 367 |
| 1 | 013 | 023 | 056 | 156 | 256 |
| 2 | 014 | 024 | 057 | 157 | 257 |
| 3 | 015 | 025 | 045 | 125 | 245 |
| 4 | 016 | 026 | 046 | 126 | 246 |
| 5 | 017 | 027 | 047 | 127 | 247 |
| 6 | 034 | 134 | 234 | 346 | 124 |
| 7 | 035 | 135 | 235 | 345 | 145 |
| 8 | 036 | 136 | 236 | 356 | 146 |
| 9 | 037 | 137 | 237 | 357 | 147 |

It will be noted that conductors 500, 501 and 502 are marked only by the tens register, conductor 507 is marked only by the units register and conductors 503 to 506 may be marked by either register. With relays T0(6) and U0(8) operated, battery connected to conductor 510, as will be described hereinafter, is extended over contact 8 of relay U0(8) to conductor 507, over contact 7 of relay U0(8) to conductor 506 and over contact 6 of relay U0(8), conductor 800, contact 4 of relay T0(6) to conductor 505 thereby setting up the code 567 which is assigned to the line 110, occupying the No. 00 time slot at the concentrator.

It will be observed that certain conductors are marked directly by the operated units register relay while other conductors are marked by the joint operation of a tens register relay and a units register relay. The various units register relays connect the marking potential to one or more of conductors 800 to 802 and conductors 810 to 814 which are extended by the tens register to one or more of conductors 500 to 506. The tens register relays connect the marking potential to one or more of conductors 600 to 602 which are extended by the units register to one or more of the conductors 503 to 507.

In the manner described in the Busch patent the marker, having chosen to serve the vertical group to which the line concentrator corresponds as indicated by the operation of relay VGA0(4), operates the line link frame connector 416 followed by relay VGB0(4). The marker is now ready to complete the selection of the calling line which it is to serve. The horizontal group and vertical file indications are furnished to the marker by the units and tens registers. The horizontal group indication is furnished over a contact extending from ground at contact 4 of relay VGA0(4), conductor 411, contact 3 of relay U0(8), conductor 820 through the line link marker connector 407. The vertical file indication is furnished over a circuit extending from ground at contact 5 of relay VGA0(4), conductor 412, contact 1 of relay T0(6), conductor 610 through the line link frame connector 416.

The marker now has sufficient information to set up the dial-tone connection which it proceeds to attempt. The line link test conductors 420 to 429 are extended from the line link frame connector 416 over contacts of relay VGB0(4) to the sleeve conductors of the line concentrator trunks which correspond to the line links of an ordinary line line frame. As previously mentioned, if the traffic requires, an additional pair of trunks may be provided. In this case trunks No. 8 and No. 9 are paired and both appear on the No. 8 line junctor switch while the additional trunks No. 10 and No. 11 are paired and both appear on the line junctor switch LJ9. A preference circuit is provided for each pair of trunks, that for trunks No. 10 and No. 11 being shown in Fig. 2. Relay DTA(2) is connected over conductor 200 to the sleeve conductor 220 of the No. 10 trunk while relay DTB(2) is connected over conductor 201 to sleeve conductor 221 of the No. 11 trunk. When relay VGA0(4) operates, it connects battery to conductors 414 and 415 leading to the windings of relays DTA(2) and DTB(2) to make a preliminary test of trunks No. 10 and No. 11. If either of the trunks is busy, the associated relay will operate. It may be noted that this preliminary test of the paired trunks is made only during a dial-tone connection when relay VGA0(4) is operated. The marker in making line line test, connects battery through a test relay to each of the conductors 420 to 429. Conductor 420 is connected over a contact of relay VGB0(4) to the sleeve conductor 210 of trunk No. 0. Conductor 429 is connected over a contact of relay VGB0(4) to conductor 417. If both trunks No. 10 and No. 11 are idle, conductor 417 is extended over contact 7 of relay PB(2) to conductor 200 and thence to the sleeve conductor 220 of trunk No. 10. If trunk No. 10 had been busy, relay DTA(2) would have operated and locked to battery over its contact 2 independent of relay VGA0(4), thereby remaining operated as long as that trunk is busy. With relay DTA(2) operated, the circuit of relay PB(2) is open and conductor 417 is connected to the sleeve conductor 200 of the busy trunk so that the marker cannot select the second trunk of the pair, even though it may be idle. Similarly, if trunk No. 11 is busy, relay DTB(2) is operated and locked so that when relay VGB0(4) operates, a circuit is closed from battery over a contact of relay VGB0(4), conductor 430, winding and contact 9 of relay PB(2) to ground at contact 2 of relay DTB(2). Relay PB(2) operates in this circuit, locking over its contact 10 and conductor 431 to ground at a contact of relay VGB0(4), holding relay PB(2) operated as long as the connector circuit is in use. With relay PB(2) operated, test conductor 417 is connected over contact 8 of relay PB(2) to conductor 201 and the sleeve conductor 221 of the busy trunk No. 11.

When the marker is setting up a connection other than a dial-tone connection, as will be described hereinafter, the line link marker connector and relay VGA0(4) are not operated. Therefore, under this condition battery is not connected to the windings of relays DTA(2) and DTB(2). For such a call if, for example, trunk No. 10 is busy, as soon as relay VGB0(4) is operated ground on sleeve conductor 220 will be extended over conductor 200, contact 1 of relay DTA(2), contact 1 of relay DTB (2), contact 9 and winding of relay PB(2), conductor 430 to battery over the contact of relay VGB0(4) causing relay PB(2) to operate and extend the test conductor 417 to the sleeve conductor of trunk No. 11.

As soon as relay VGB0(4) operated, it started the selection of the calling line through the number translator at the concentrator. A checking circuit is closed first to determine that one and only one register relay is operated in each of the registers. This circuit may be traced from ground, contact 8 of relay U9(8), contacts 3 of relays U8(8) to U1(8), contact 2 of relay U0(8), conductor 830, contact 14 of relay T4(6), contact 15 of relay T3(6), contact 13 of relay T2(6), contact 13 of relay T1(6), contact 11 of relay T0(6), conductor 620, contact of relay VGB0(4), conductor 434, contact 1 of relay CC(5), winding of relay SCC(5) to battery.

Relay SCC(5) operates in this circuit, closing a circuit from battery through the winding of relay NGP(5), contact 1 of relay SCC(5), conductor 511, contact of relay VGB0(4), conductor 101 of the control trunk to ground through the winding of relay TA(1) at the line concentrator. Conductor 101 is also connected to ground through the winding of relay TA(4). Relays NGP(5), TA(4), and TA(1) operate in this circuit. Relays TA(1) and TA(4) disconnect the signaling trunk conductors 102 and 103 from the line scanner at the line concentrator and the common scanner at the central office. Relay NGP(5) closes a circuit from battery through the winding of relay CCP(5), contact 1 of relay NGP(5) to ground over contact 2 of relay SCC(5). Relay CCP(5) operates and locks over its contact 2 to ground at contact 2 of relay SCC(5), independent of relay NGP(5). Relay NGP(5) also closes a circuit from battery over its contact 2, conductor 513 through resistance 512 to ground through the windings of relays LTS1(5) and LTS2(5) causing these relays to operate. A branch of this circuit extends from conductor 513 over a contact of relay VGB0(4), contact 1 of relay TA(4), conductor 102 of the signaling trunk, contact 2 of relay TA(1) to ground through the windings of relays NGC0(1) and NGC1(1).

At the line concentrator, the operation of relays NGC0(1) and NGC1(1) disconnects the tip conductors of trunks No. 0 to No. 7 from the concentrator switching relays, connects ground to these relays to maintain any connections which may exist thereover and extends these tip conductors to conductors 120 to 127 leading to the operating relays for the number group translator of Fig. 3.

At the central office the tip conductors of trunks No. 0 to No. 7 are extended over front contacts of relays LTS1(5) to conductors 500 to 507 which have been marked by the tens and units registers. Relay LTS2(5) at its contact 4, connects battery to conductor 510, which is extended as previously traced to conductors 505, 506 and 507 and thence over contacts 12, 14 and 16 of relay LTS1(5), conductors 525, 526 and 527, contacts of relay VGB0(4), conductors like conductor 440, connected to the tip conductors of trunks No. 5, No. 6 and No. 7, contacts 6, 9 and 12 of relay NGC1(1), conductors 125, 126 and 127, windings of relays 305, 306 and 307 to ground. Relays 305, 306 and 307 operate in this circuit and extend the battery from their operating circuits to conductors 101 holding relays TA(1) and TA(4) operated. This battery also extends to the winding of relay NGP(5) and, since the other side of the winding of relay NGP(5) is also connected to battery, causes relay NGP(5) to release. With relay NGP(5) released, battery is connected over contact 3 of relay NGP(5), contact 3 of relay CCP(5), contact 1 of relay SCC(5) to conductor 511 and thence as above traced to conductor 101 holding relays TA(4) and TA(1) and providing a locking circuit for relays 305, 306 and 307. With relay NGP(5) released, relays LTS1(5), LTS2(5), NGC0(1) and NGC1(1) release, restoring the trunks to their normal condition.

A line test circuit is now closed which may be traced from the −48 volt battery supply on conductor 100 through resistance 113, conductor 114, contact 7 of relay 305, contact 7 of relay 306, contact 7 of relay 307, contacts 10 of relays 300, 301 and 302, contact 11 of relay 303, contact 10 of relay 304, contact 11 of relay 305, contacts 10 of relays 306 and 307, conductor 310, contact 4 of relay TA(1), conductor 103 of the signaling trunk, contact 3 of relay TA(4), contact of relay VGB0(4), conductor 432, contact 3 of relay LTS2(5), contact 1 of relay CCP(5), contact 3 of relay CC(5), contact 6 of relay LH(5) to the grid of line busy test tube LBT(5). Since this is an originating call, line 110 is idle and the negative potential on the grid of tube LBT(5) does not cause the operation of relay LB(5).

It will be observed that this line test circuit includes not only the three selective front contacts on relays 305, 306 and 307 but also a chain circuit which checks that three and only three of the number translator relays are operated. The test circuits for lines 00 and 49 are shown complete. For the remaining lines the number of the line is indicated at the corresponding output conductor from the number translator.

In the manner disclosed in the above-identified Busch patent the marker selects an idle originating register and an idle channel and, assuming that the selected channel includes the No. 0 line link the marker will connect battery to conductor 550. At the line concentrator control circuit the select magnet operating circuits are extended to the windings of relays TS0(5) to TS9(5) instead of directly to the select magnets. With battery connected to conductor 550, relay TS0(5) operates in series with resistance 516 to indicate to the concentrator control circuit that the marker intends to establish a connection using the No. 0 trunk. Relay TS0(5) closes a circuit from battery through resistance lamp L0(5), contact 2 of relay TS0(5), conductor 560, contact of relay VGB0(4), conductor 450 to ground through the winding of select magnet 230. The select magnet 230 operates and prepares the associated crosspoints for operation.

In addition, relay TS0(5) connects the tip conductor 440 of the selected trunk over a contact of relay VGB0(4), conductor 520, contact 1 of relay LTS1(5), contact 4 of relay TS0(5) to contact 2 of relay LH(5) to prepare for operating the crosspoint at the line concentrator. It also connects the sleeve conductor 210 of the selected trunk over a contact of relay VGB0(4), conductor 420, contact 3 of relay TS0(5) to contact 3 of relay LH(5) to prepare a circuit for simulating the grounding of the sleeve of the line link over the operating circuit of the line hold magnet on the usual line link frame.

When the marker has tested and found an idle channel including an idle trunk from the concentrator, it sets up the connection and eventually connects ground to conductor 470 which would result, in the regular line link frame, in operating the hold magnet individual to the calling line. In the present case the circuit is completed from conductor 470, contact 3 of relay T0(6), conductor 621, contact 1 of no-test relay NT(5), contact 1 of line busy relay LB(5) to battery through the winding of relay LH(5). Relay LH(5) operates and locks over its contact 4 to conductor 621 independent of relays NT(5) and LB(5).

With relay LH(5) operated, −90 volt battery is connected over contact 3 of relay NT(5), contact 5 of relay LH(5), contact 3 of relay CC(5), contact 1 of relay CCP(5), contact 3 of relay LTS2(5), conductor 432, contact of relay VGB0(4), contact 3 of relay TA(4), conductor 103 to the line concentrator, contact 4 of relay TA(1), conductor 310, through the number translator as previously traced to conductor 114 which is connected through resistance 115 to the common cathode of the line tube 116 individual to line 110. At the same time +45 volt battery is connected through the right winding of relay CC(5), contact 4 of relay CC(5), contact 2 of relay LH(5), contact 4 of relay TS0(5), contact 1 of relay LTS1(5), conductor 520, contact of relay GVB0(4), conductor 440 over the tip conductor of the selected trunk, contact 1 of relay NGC0(1), through the windings of the crosspoint reed relays 130, 131, etc. individual to trunk No. 0 to the corresponding anodes of tubes 116, 117, etc. of the various lines. With −90 volts connected to the cathode of tube 116, that tube breaks down, permitting relay 130 to operate, closing its contacts and locking over its contact 3 and resistance 115 to conductor 114. The closure of contact 3 of relay 130 completes a shunt around tube 116 to extinguish the tube. The tube is used in this circuit to provide the lockout to prevent trunks which are in use from connecting with the calling line when the marking voltage is applied to its tube and to prevent other lines which are active from being connected to trunks which are being marked for establishing a new connection. The voltage on the cathode is limited by the use of resistance 115 which is in series with the operated reed relay when a connection is established and the winding of the supervisory relay in the associated trunk or register circuit which is connected to the tip conductor of the trunk, such as conductor 440, and constitutes the lockout protection to prevent connection by a line to more than one trunk under normal conditions. This is a well-known type of gas tube lockout network as shown, for example, in Patent 2,594,389 to E. Bruce, April 29, 1952.

When the crosspoint relay 130 operates, connecting conductor 440 to conductor 114, the impedance of the marking circuit changes sufficiently to permit relay CC(5) to operate. Relay CC(5) closes a locking circuit for itself from battery over its contact 5 and through its left winding to ground at contact 1 of relay LH(5). Relay CC(5) disconnects +45 volt battery from conductor 440 and disconnects −90 volt battery from conductor 114. Relay 130 remains operated in a circuit from −48 volt battery supplied to conductor 100, resistances 113 and 115, contact 3 and winding of relay 130, contact 1 of relay NGC0(1), conductor 440 and thence over the crosspoint LJ0(2) and the connection which has been set up, to ground in the connected originating register. At its contacts 1 and 2, relay 130 connects the substation 110 to the conductors of the No. 0 trunk whence it is extended to the register in the usual manner.

With relay CC(5) operated, the circuit of relay SCC(5) is opened and that relay releases, in turn releasing relay CCP (5), relay TA(4), relay TA(1) and relays 305, 306 and 307 in the line concentrator so that the control equipment at the concentrator is now restored to normal. With relay CC(5) operated, conductor 470 which was grounded by the marker and extends as above traced to conductor 621 is further extended over contact 4 of relay LH(5), contact 2 of relay CC(5), contact 3 of relay LH(5), contact 3 of relay TS0(5), conductor 420, contact of relay VGB0(4), conductor 210 to the sleeve conductor of the established connection. This ground passes through all of the crosspoints in the central office connection and is detected by the marker at the trunk link frame to check that the connection has been established. This ground starts the marker release functions which include the release of relay VGA0(4), VGB0(4), LH(5) and the line link frame connector 416.

The release of relay VGA0(4) causes left tubes 900 and 902 of the No. 0 tens and units flip-flops to stop conducting and permits the associated right tubes 901 and 903 to again conduct. With tubes 900 and 902 no longer conducting, relay T0(6) of the tens register and relay U0(8) of the units register release.

If no further calls are waiting in this line concentrator, tube 404 ceases to conduct and relay VGS(4) releases, in turn releasing the line link marker connector 407 and thereby restoring the central office line concentrator control circuit to normal. If some other call is waiting, relay VGS(4) remains operated and a new originating call is started in the manner of the previously described call.

If either relay DTA(2) or relay DTB(2) has been operated, they remain locked as long as the associated trunk remains busy. The release of relay VGB0(4) opens the circuit of relay PB(2) causing that relay to release if it has been operated.

The subscriber on line 110 may now operate his dial and register the number of the wanted line in the central office register.

*Call-back call*

When the subscriber has finished dialing, the originating register calls in the same or another marker and transmits the wanted line number to the marker. As a part of the establishment of the dial-tone connection the marker transfers to the originating register the identity of the calling line and the identity of the line link (trunk) which is used for the dial-tone connection. The originating register also transfers this information to the marker which is to control the setting up of the connection.

The selection of a trunk by the marker takes place as described in the Busch patent.

The marker has a record of the identity of the calling line in the form of a frame designation, a horizontal group, a vertical group and a vertical file registration. The marker uses the frame designation to operate the line link frame connector 416 after which it connects battery to conductor 418, corresponding to the vertical group information thereby operating relay VGB0(4) to select the line concentrator control circuit associated with the calling line. In addition, it connects a negative potention to horizontal group conductor 480 and vertical file conductor 470.

Conductor 480 is extended over contact 5 of relay U0(8), conductor 840 to the grid of tube 903 of the No. 0 units flip-flop, extinguishing that tube and causing tube 902 to conduct. Similarly, conductor 470 is extended over contact 2 of relay T0(6) and conductor 630 to the grid of tube 901 of the No. 0 tens flip-flop, extinguishing that tube and causing tube 900 to conduct. For a call-back call, ground is supplied to conductor 413 from the line link frame connector 416 to complete the cathode circuit of the left tubes. With tubes 900 and 902 conducting, the previously traced circuits for relays T0(6) and U0(8) are closed, causing these relays to operate.

With relays T0(6) and U0(8) operated, a circuit is closed from battery through the winding of relay SCC(5), contact 1 of relay CC(5), conductor 434, contact of relay VGB0(4), conductor 620, contact 11 of relay T0(6), contact 13 of relay T1(6), contact 13 of relay T2(6), contact 15 of relay T3(6), contact 14 of relay T4(6), conductor 830, contact 2 of relay U0(8), contacts 3 of relays U1(8) to U8(8), contact 2 of relay U9(8) to ground, operating relay SCC(5). With relay SCC(5) operated, relays NGP(5), TA(4) and TA(1) are operated in the manner previously described, in turn operating relays CCP(5), LTS1(5), LTS2(5), NGC0(1) and NGC1(1).

With relays T0(6) and U0(8) operated, conductors 505, 506 and 507 are marked with battery and relays 305, 306 and 307 of the number translator are operated as above described. The operation of relays 305, 306 and 307 causes relay NGP(5) to release, in turn releasing relays NGC0(1), NGC1(1), LTS1(5) and LTS2(5). The cathode circuit for the calling line is closed from conductor 114 over contact 7 of relay 305, contact 7 of relay 306, contact 7 of relay 307, contacts 10 of relays 300, 301 and 302, contact 11 of relay 303, contact 10 of relay 304, contact 11 of relay 305, contact 10 of relay 306, contact 10 of relay 307, conductor 310, contact 4 of relay TA(1), conductor 103, contact 3 of relay TA(4), contact of relay VGB0(4), conductor 432, contact 3 of relay LTS2(5), contact 1 of relay CCP(5), contact 3 of relay CC(5), contact 6 of relay LH(5) to the grid of the line busy test tube LBT(5).

Since line 110 is still connected with the originating register the potential on conductor 114 will be such that tube LBT(5) becomes conducting and completes a circuit through the left winding of relay LB(5) operating that relay. Relay LB(5) at its contact 1 opens the operating circuit for relay LH(5) and at its contact 2 connects ground from contact 3 of relay SCC(5) over contact 1 of relay NT(5) to conductor 621 and thence to conductor 470 over which the marker first tests the line and then operates the hold magnet when operating with a regular line link frame. On call-back calls the marker ignores this busy indication and proceeds to release the originating register, with which the line has been connected, so that the line becomes idle and relay LB(5) releases. On the subsequent line busy test the line is found idle and the marker proceeds to set up the connection in the manner described for the originating call.

It may be noted that at the time the marker releases the dial-tone connection, no originating indication can be given although the line returns to a calling condition, since relays TA(1) and TA(4) are held operated until after the call-back connection has been established.

If the dial-tone connection had been established over one of the trunks No. 10 or No. 11, for example trunk No. 10, relay DTA(2) would have been operated and remained locked to the sleeve of the trunk No. 10. Therefore when the marker tests the trunks for the call-back connection, test conductor 429 would be extended over contact of relay VGB0(4), conductor 417, contact 7 of relay PB(2) to the sleeve conductor of the trunk used for the dial-tone connection, that is, trunk No. 10. As disclosed in the Busch patent the marker records the identity of the line link which is used in the dial-tone connection and transmits the information to the originating register. The register in turn transmits this indication to the marker which sets up the call-back connection so that this line link may be used for the call-back connection, since it will become idle as soon as the dial-tone connection is released.

If trunk No. 11 had been used, relay DTB(2) would have been operated during the dial-tone call, when relay VGB0(4) operates for the call-back call relay PB(2) operates and locks. Therefore, under this condition, test conductor 429 would be extended over contact of relay VGB0(4), conductor 417, contact 8 of relay PB(2) and conductor 201 to sleeve conductor 221 of trunk No. 11.

If neither relay DTA(2) nor relay DTB(2) is operated, test conductor 429 is extended to conductor 417 and thence over contact 7 of relay PB(2), conductor 200 to the sleeve conductor 220 of trunk No. 10. It may be noted that if trunk No. 10 is selected for a call-back call, relay DTA(2) cannot operate, since relay VGA0(4) is not operated to supply the operating battery to that relay.

*Terminating call*

The operation for setting up a terminating call is very similar to the operation of setting up a call-back call. The identity of the wanted line is recorded in the marker in the same form as for a calling line, but in this case it is obtained by means of a number group circuit at the central office which translates the numerical line designation into the line location designation. If the wanted line is idle the marker sets up the connection as previously described. If the wanted line is busy, the marker proceeds to connect the calling line to a busy tone trunk and restores the line link frame to normal.

On terminating calls the operated crosspoint relay is held operated initially from ground supplied to the tip conductor from the central office ringing ground while ringing is taking place. During the transfer from ringing to supervision, after the ringing is tripped, the crosspoint relay is held operated by the discharge of a condenser in the trunk circuit.

*No-test calls*

When a call is originated at a test desk or other switchboard where it is desired to establish a connection to the called line regardless of whether it is busy or idle, special trunks are used known as "no-test" incoming trunk circuits. When the marker is seized in connection with such a call it functions as on a regular terminating call if the line is idle. If the line is busy the marker is equipped to set up a double connection to the line which, on regular line link frames, is done by means of a special no-test crossbar switch vertical which connects the incoming trunk circuit through special no-test connector switches to the line link being used on the busy connection.

With the line links on the concentrator type of line link frames representing trunks to the concentrator, it is difficult to obtain from the concentrator the identity of the trunk being used on the busy connection. Therefore in accordance with the present invention no-test connections are established by setting up a double connection at the concentrator, using special voltages on the line tubes to override the effect of the lockout protecting resistances.

When the marker is seized in connection with a no-test call, a no-test relay is operated in the marker which, when the marker operates the line link frame connector 416, connects battery to conductor 433 operating relay NT(5). With relay NT(5) operated, the line test circuit from the marker which extends as previously traced to conductor 621 is connected over contact 2 of relay NT(5) to the winding of relay LH(5) independent of the busy test relay LB(5). The line appears idle to the marker. Relay LH(5) operates whether the line is busy or idle. If the line is idle and relay LB(5) is not operated the −90 volts for operating the line tube and the crosspoint relay is supplied over contact 3 of relay LB(5) and contact 4 of relay NT(5). If the line is busy, so that relay LB(5) has been operated in response to the pretest of the line, −135 volts is connected over contact 4 of relay LB(5), contact 4 of relay NT(5) and thence as previously traced to the common cathode of the line tube, thereby compensating for the voltage drop across resistance 115 introduced by the circuit through the operated reed relay connecting the called line to the originally established connection. A double connection is therefore established to the called line circuit over a concentrator trunk selected by the marker. If no such second concentrator trunk is available for this call the marker treats the call as a usual all-paths-busy call and returns an overflow signal to the calling operator or test man.

In regular line link frames, the operating circuits for the select magnets are extended directly to the marker, where the marker has means for detecting crosses between these circuits. Since, in the concentrator control circuit, relays TS0(5) to TS9(5) close the associated select magnet operating circuits locally, means has been provided for testing the select magnet operating circuits comprising relay XSM(5) which is connected over the back contacts of relays TS0(5) to TS9(5) to the select magnet operating circuits. When relay TS0(5), for example, operates, it disconnects the operating circuit for select magnet 230 from the winding of relay XSM(5). However, if a cross exists between the circuit of select magnet 220 and some other select magnet circuit, relay XSM(5) will be operated, connecting a shunt around resistance 516. With resistance 516 shunted, the impedance of the operating circuit for relay TS0(5) is lowered to cause the marker to react in the same manner as on calls to regular line link frames.

What is claimed is:

1. In a telephone system, a central office, a subsidiary office, a plurality of subscriber lines at said subsidiary office, a plurality of talking trunks connecting said central office and said subsidiary office, a plurality of control conductors connecting said central office and said subsidiary office, a register at said central office, means for operating said register in accordance with the identity of a line, a translator at said subsidiary office, means to operate said translator under the control of said register, a busy test contact individual to said line, busy test means at said central office, means under the control of said translator to connect said busy test contact with said busy test means over one of said control conductors, gas tube controlled means at said subsidiary office to connect said wanted line with each of said talking trunks, and means in said central office effective if said busy test means indicates that said line is idle to apply predetermined potentials to said one control conductor and to a conductor of one of said talking trunks to operate said gas tube controlled connecting means to connect said wanted line with said central office over said one talking trunk.

2. In a telephone system, a central office, a subsidiary office, a plurality of subscriber lines at said subsidiary office, a plurality of talking trunks connecting said central office and said subsidiary office, means for connecting any one of said lines to any one of said trunks comprising a set of relays individual to each line, each set including a relay connected to one conductor of each talking trunk, gas tube means connected in series with each relay, a plurality of control conductors connecting said central office and said subsidiary office, a register at said central office, means for operating said register in accordance with the identity of a line, a translator at said subsidiary office, means to operate said translator under the control of said register, a busy test contact individual to said line, said busy test contact connected in multiple to all of the gas tube means connected to the relays individual to said line, busy test means at said central office, means under the control of said translator to connect said busy test contact with said busy test means over one of said control conductors, and means in said central office effective if said busy test means indicates that said line is idle to apply predetermined potentials to said one control conductor and to a conductor of a selected one of said talking trunks to operate the gas tube and the relay of the set individual to said line and connected with said selected trunk to connect said wanted line with said central office over said selected talking trunk.

3. In a telephone system, a central office, a subsidiary office, a plurality of subscriber lines at said subsidiary office, a plurality of talking trunks connecting said central office and said subsidiary office, means for connecting any one of said lines to any one of said trunks comprising a set of relays individual to each line, each set including a relay connected to one conductor of each talking trunk, gas tube means connected in series with each relay, a plurality of control conductors connecting said central office and said subsidiary office, a register at said central office, means for operating said register in accordance with the identity of a line, a translator at said subsidiary office, means responsive to the operation of said register to disconnect said one conductors of said trunks from said relays and to connect said register and said translator over said one conductors, means including said one conductors to operate said translator under the control of said register, means responsive to the operation of said translator to disconnect said register and said translator from said conductors and restore the connection between said conductors and said relays, a busy test contact individual to said line, said busy test contact connected in multiple to all of the gas tube means connected to the relays individual to said line, busy test means at said central office, means under the control of said translator to connect said busy test contact with said busy test means over one of said control conductors, and means in said central office effective if said busy test means indicates that said line is idle to apply predetermined potentials to said one control conductor and to said one conductor of a selected one of said talking trunks to operate the gas tube and the relay of the set individual to said line and connected with said selected trunk to connect said wanted line with said central office over said selected talking trunk.

4. In a telephone system, a central office, a subsidiary office, a plurality of subscriber lines at said subsidiary office, a plurality of talking trunks connecting said central office and said subsidiary office, a plurality of control conductors connecting said central office and said subsidiary office, a register at said central office, means for operating said register in accordance with the identity of a line, a translator at said subsidiary office, means to operate said translator under the control of said register, a busy test contact individual to said line, busy test means at said central office, means under the control of said translator to connect said busy test contact with said busy test means over one of said control conductors, common control means in said central office, means under the control of said busy test means to indicate to said common control means whether said line is busy or idle, gas tube controlled means at said subsidiary office to connect said wanted line with each of said talking trunks, means operated by said common control means to select one of said talking trunks, and means in said central office operated by said common control means if said busy test means indicates that said line is idle to apply predetermined potentials to said one control conductor and to a conductor of the selected one of said talking trunks to operate said gas tube controlled connecting means to connect said wanted line with said central office over said selected talking trunk.

5. In a telephone system, a central office, a subsidiary office, a plurality of subscriber lines at said subsidiary office, a plurality of talking trunks connecting said central office and said subsidiary office, a plurality of control conductors connecting said central office and said subsidiary office, common control means in said central office, a register at said central office, means for operating said register in accordance with the identity of a line comprising a plurality of multivibrators, means to selectively operate said multivibrators under the control of a calling line, means to selectively operate said multivibrators under the control of said common control means, a translator at said subsidiary office, means to operate said translator under the control of said register, a busy test contact individual to said line, busy test means at said central office, means under the control of said translator to connect said busy test contact with said busy test means over one of said control conductors, means under the control of said busy test means to indicate to said common control means whether said line is busy or idle, gas tube controlled means at said subsidiary office to connect said wanted line with each of said talking trunks, means operated by said common control means to select one of said talking trunks, and means in said central office operated by said common control means if said busy test means indicates that said line is idle to apply predetermined potentials to said one control conductor and to a conductor of the selected one of said talking trunks to operate said gas tube controlled connecting means to connect said wanted line with said central office over said selected talking trunk.

6. In a telephone system, a central office, a subsidiary office, a plurality of subscriber lines at said subsidiary office, a plurality of talking trunks connecting said central office and said subsidiary office, a plurality of control conductors connecting said central office and said subsidiary office, common control means in said central office, a register at said central office, means for operating said register in accordance with the identity of a line comprising a plurality of multivibrators, means to selectively operate said multivibrators under the control of a calling line comprising means for generating and detecting time division pulses, means to selectively operate said multivibrators under the control of said common control means, a translator at said subsidiary office, means to operate said translator under the control of said register, a busy test contact individual to said line, busy test means at said central office, means under the control of said translator to connect said busy test contact with said busy test means over one of said control conductors, means under the control of said busy test means to indicate to said common control means whether said line is busy or idle, gas tube controlled means at said subsidiary office to connect said wanted line with each of said talking trunks, means operated by said common control means to select one of said talking trunks, and means in said central office operated by said common control means if said busy test means indicates that said line is idle to apply predetermined potentials to said one control conductor and to a conductor of the selected one of said talking trunks to operate said gas tube controlled connecting means to connect said wanted line with said central office over said selected talking trunk.

7. In a telephone system, a central office, a subsidiary office, a plurality of subscriber lines at said subsidiary office, a plurality of talking trunks connecting said central office and said subsidiary office, a plurality of control conductors connecting said central office and said subsidiary office, a register at said central office, means for operating said register in accordance with the identity of a line, a translator at said subsidiary office, means to operate said translator under the control of said register, a busy test contact individual to said line, busy test means at said central office, means under the control of said translator to connect said busy test contact with said busy test means over one of said control conductors, gas tube controlled means to connect said wanted line with each of said talking trunks, means in said central office effective if said busy test means indicates that said line is idle to apply predetermined potentials to said one control conductor and to a conductor of one of said talking trunks to operate said gas tube controlled connecting means to connect said wanted line with said central office over said one talking trunk, no-test indicating means, and means under the joint control of said no-test indicating means and said busy test means if said line is busy to apply a different predetermined potential to said one control conductor and said predetermined potential to a conductor of another one of said talking trunks to operate said gas tube controlled connecting means to also connect said wanted line to said central office over said other talking trunk.

8. In a telephone system, a central office, a subsidiary office, a plurality of subscriber lines at said subsidiary office, a plurality of talking trunks connecting said central office and said subsidiary office, means for connecting any one of said lines to any one of said trunks comprising a set of relays individual to each line, each set including a relay connected to one conductor of each talking trunk, gas tube means connected in series with each relay, a plurality of control conductors connecting said central office and said subsidiary office, a register at said central office, means for operating said register in accordance with the identity of a line, a translator at said subsidiary office, means to operate said translator under the control of said register, a busy test contact individual to said line, said busy test contact connected in multiple to all of the gas tube means connected to the relays individual to said line, busy test means at said central office, means under the control of said translator to connect said busy test contact with said busy test means over one of said control conductors, means in said central office effective if said busy test means indicates that said line is idle to apply predetermined potentials to said one control conductor and to a conductor of a selected one of said talking trunks to operate the gas tube and the relay of the set individual to said line and connected with said selected trunk to connect said wanted line with said central office over said selected talking trunk, no-test indicating means, and means under the joint control of said no-test indicating means and said busy test means if said line is busy to apply a different predetermined potential to said one control conductor and said predetermined potential to a conductor of another selected one of said talking trunks to operate the gas tube and the relay of the set individual to said line and connected with said other selected trunk to also connect said wanted line to said central office over said other talking trunk.

9. In a telephone system, a central office, a subsidiary office, a plurality of subscriber lines at said subsidiary office, a plurality of talking trunks connecting said central office and said subsidiary office, a plurality of control conductors connecting said central office and said subsidiary office, a register at said central office, means for operating said register in accordance with the identity of a line, a translator at said subsidiary office, means to operate said translator under the control of said register, a busy test contact individual to said line, busy test means at said central office, means under the control of said translator to connect said busy test contact with said busy test means over one of said control conductors, common control means in said central office, means under the control of said busy test means to indicate to said common control means whether said line is busy or idle, gas tube controlled means at said subsidiary office to connect said wanted line with each of said talking trunks, means operated by said common control means to select one of said talking trunks, means in said central office operated by said common control means if said busy test means indicates that said line is idle to apply predetermined potentials to said one control conductor and to a conductor of the selected one of said talking trunks to operate said gas tube controlled connecting means to connect said wanted line with said central office over said selected talking trunk, no-test indicating means, means in said common control means to operate said no-test indicating means, and means under the joint control of said no-test indicating means and said busy test means if said line is busy to apply a different predetermined potential to said one control conductor and said predetermined potential to a conductor of another selected one of said talking trunks to operate said gas tube controlled connecting means to also connect said wanted line to said central office over said other talking trunk.

References Cited in the file of this patent

UNITED STATES PATENTS

| | | |
|---|---|---|
| 2,532,097 | Hersey | Nov. 28, 1950 |
| 2,585,904 | Busch | Feb. 19, 1952 |
| 2,631,195 | Ostline | Mar. 10, 1953 |